(12) United States Patent
Matsui

(10) Patent No.: US 10,594,904 B2
(45) Date of Patent: *Mar. 17, 2020

(54) CORRECTION COEFFICIENT CALCULATION UNIT, IMAGE CONVERSION UNIT, COLOR CORRECTION DEVICE, DISPLAY DEVICE, CORRECTION COEFFICIENT CALCULATION METHOD, AND PROGRAM

(71) Applicant: NEC Display Solutions, Ltd., Tokyo (JP)

(72) Inventor: Katsuyuki Matsui, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 17 days.

This patent is subject to a terminal disclaimer.

(21) Appl. No.: 15/972,560

(22) Filed: May 7, 2018

(65) Prior Publication Data

US 2018/0255209 A1 Sep. 6, 2018

Related U.S. Application Data

(63) Continuation of application No. 15/101,907, filed as application No. PCT/JP2013/083493 on Dec. 13, 2013, now Pat. No. 9,992,384.

(51) Int. Cl.
*H04N 1/60* (2006.01)
*H04N 1/46* (2006.01)
*H04N 1/64* (2006.01)

(52) U.S. Cl.
CPC ............. *H04N 1/6055* (2013.01); *H04N 1/46* (2013.01); *H04N 1/60* (2013.01); *H04N 1/6008* (2013.01);

(Continued)

(58) Field of Classification Search
None
See application file for complete search history.

(56) References Cited

U.S. PATENT DOCUMENTS 6,803,921 B1 * 10/2004 Balasubramanian ........................ G06T 11/001 345/593
7,796,296 B2 * 9/2010 Martinez .............. H04N 1/6011 358/1.9

(Continued)

FOREIGN PATENT DOCUMENTS

CN 101136998 A 3/2008
CN 101291387 A 10/2008

(Continued)

OTHER PUBLICATIONS

International Search Report (ISR) (PCT Form PCT/ISA/210), in PCT/JP2013/083493, dated Mar. 4, 2014.

(Continued)

*Primary Examiner* — Hilina K Demeter
(74) *Attorney, Agent, or Firm* — McGinn IP Law Group, PLLC

(57) ABSTRACT

A correction coefficient calculation unit including a reference image output unit that generates a reference image, a profile receiving unit that receives image information and printing information, the image information indicating a color characteristic related to an image to be displayed on a display unit, the printing information indicating a color characteristic related to a printing device, and a reference image division unit that creates printing characteristic data that associates the reference image with the reference image that has undergone color conversion based on the printing information and the image information.

16 Claims, 9 Drawing Sheets

(52) U.S. Cl.
CPC ......... *H04N 1/6011* (2013.01); *H04N 1/6033* (2013.01); *H04N 1/644* (2013.01)

(56) References Cited

U.S. PATENT DOCUMENTS

| | | | | |
|---|---|---|---|---|
| 7,894,111 B2* | 2/2011 | Woolfe | ............... | H04N 1/6011 358/1.15 |
| 2005/0219561 A1* | 10/2005 | Haikin | ............... | H04N 1/6011 358/1.9 |
| 2006/0001931 A1* | 1/2006 | Danciu | ............... | G06T 15/00 358/527 |
| 2007/0279659 A1* | 12/2007 | Hasegawa | ............ | H04N 1/6058 358/1.9 |
| 2008/0013114 A1* | 1/2008 | Hasegawa | ............. | H04N 1/603 358/1.6 |
| 2008/0278736 A1* | 11/2008 | Kawashima | .......... | G06F 3/1211 358/1.9 |
| 2008/0297818 A1* | 12/2008 | Shimbaru | ............ | H04N 1/6058 358/1.9 |
| 2009/0116046 A1* | 5/2009 | Nakashio | ............ | H04N 1/6025 358/1.9 |
| 2009/0284774 A1* | 11/2009 | Kishimoto | ........... | H04N 1/6027 358/1.9 |
| 2010/0128981 A1* | 5/2010 | Kurumisawa | ........ | H04N 1/4074 382/167 |
| 2010/0157337 A1* | 6/2010 | Akado | ................. | H04N 1/6033 358/1.9 |
| 2010/0265524 A1* | 10/2010 | Muramatsu | ........ | H04N 1/32106 358/1.9 |
| 2011/0050695 A1* | 3/2011 | Sullivan | ................ | G06T 11/001 345/426 |
| 2011/0141500 A1* | 6/2011 | Togami | ................ | H04N 1/6002 358/1.9 |
| 2011/0310446 A1* | 12/2011 | Komatsu | ............. | H04N 1/6011 358/518 |
| 2012/0013923 A1* | 1/2012 | Sakurai | ................ | H04N 1/6011 358/1.9 |
| 2012/0038938 A1* | 2/2012 | Oh | ....................... | H04N 1/6058 358/1.9 |
| 2012/0206743 A1* | 8/2012 | Murakami | ........... | H04N 1/6055 358/1.9 |
| 2012/0218572 A1* | 8/2012 | Kishino | ............... | H04N 1/6005 358/1.9 |
| 2013/0038908 A1* | 2/2013 | Nagai | ................... | H04N 1/605 358/3.23 |
| 2013/0093783 A1* | 4/2013 | Sullivan | ................. | G09G 5/06 345/601 |
| 2017/0054877 A1* | 2/2017 | Shibata | ................ | H04N 1/6019 |
| 2017/0110071 A1* | 4/2017 | Ando | ................... | G09G 3/3607 |

FOREIGN PATENT DOCUMENTS

| | | |
|---|---|---|
| CN | 101355635 A | 1/2009 |
| JP | 2005-196454 A | 7/2005 |
| JP | 2006-094297 A | 4/2006 |
| JP | 2008-245024 A | 10/2008 |
| JP | 2009-117992 A | 5/2009 |
| JP | 5322326 B | 10/2013 |

OTHER PUBLICATIONS

Non-Final Office Action dated Apr. 6, 2017 in U.S. Appl. No. 15/101,907.
Final Office Action dated Oct. 17, 2017 in U.S. Appl. No. 15/101,907.
Notice of Allowance dated Mar. 13, 2018 in U.S. Appl. No. 15/101,907.
Chinese Office Action dated Jan. 29, 2018 in corresponding Patent Application No. 201380081507.8, with an English translation thereof.

* cited by examiner

CORRECTION COEFFICIENT CALCULATION UNIT, IMAGE CONVERSION UNIT, COLOR CORRECTION DEVICE, DISPLAY DEVICE, CORRECTION COEFFICIENT CALCULATION METHOD, AND PROGRAM

CROSS-REFERENCE TO RELATED APPLICATIONS

The present application is a Continuation application of U.S. patent application Ser. No. 15/101,907, filed on Jun. 4, 2016, which is based on International Application PCT/JP2013/083493 filed on Dec. 13, 2013, the entire contents of which are hereby incorporated by reference.

TECHNICAL FIELD

The present invention relates to a correction coefficient calculation unit, an image conversion unit, a color correction device, a display device, a correction coefficient calculation method, and a program.

BACKGROUND ART

In DTP (desktop publishing) companies which design printed materials, several personal computers (hereunder, referred to as PCs) used in workflows, and display devices connected to each of the PCs are used in some cases.

When using several display devices in this way, there is a need to set the several display devices with the printed material, which is the final deliverable, as a color reference. In this case, output results of the several display devices and a printing device are required to be the same, and setting of a number of display devices needs to be done easily.

For this reason, it has been proposed to reproduce colors by means of typically used color management, by generating a color conversion table for reproducing on the display device, the colors that will appear on the target output device, and correcting the colors of an image to be displayed using the generated color correction information (for example, refer to Patent Document 1).

PRIOR ART DOCUMENTS

Patent Documents

[Patent Document 1] Japanese Patent Publication No. 5322326

SUMMARY OF THE INVENTION

Problem to be Solved by the Invention

However, in the invention disclosed in Patent Document 1, while the same output results can be achieved between a display device and a printing device for each display device, there is a problem in that setting cannot be easily performed for a number of display devices.

The present invention takes into consideration the above problem, with an object of providing a color correction device, a display device, a color correction method, and a program that are capable of easily adjusting several display devices to the output of a printing device that serves as a reference.

Means for Solving the Problem

In order to achieve the above object, a correction coefficient calculation unit according to the present invention includes: a reference image output unit that generates a reference image; a profile receiving unit that receives image information and printing information, the image information indicating a color characteristic related to an image to be displayed on a display unit, the printing information indicating a color characteristic related to a printing device; and a reference image division unit that creates printing characteristic data that associates the reference image with the reference image that has undergone color conversion based on the printing information and the image information.

In order to achieve the above object, an image conversion unit according to the present invention includes: a display correction data creation unit that creates display correction data based on display information and image information, the display information indicating a color characteristic related to a display unit, the image information indicating a color characteristic related to an image to be displayed on the display unit; a printing characteristic memory unit that receives printing characteristic data, the printing characteristic data being created by associating a reference image with the reference image that has undergone color conversion based on printing information and the image information, the printing information indicating a color characteristic related to a printing device; and an image correction unit that creates color correction information based on the display correction data and the printing characteristic data, the image correction unit performing color correction on an input image signal based on the created color correction information.

In order to achieve the above object, a color correction device according to the present invention includes a correction coefficient calculation unit and an image conversion unit, the correction coefficient calculation unit including: a reference image output unit that generates a reference image; a profile receiving unit that receives image information and printing information, the image information indicating a color characteristic related to an image to be displayed on a display unit, the printing information indicating a color characteristic related to a printing device; and a reference image division unit that creates printing characteristic data that associates the reference image with the reference image that has undergone color conversion based on the printing information and the image information, the image conversion unit including: a display correction data creation unit that creates display correction data based on display information and image information, the display information indicating a color characteristic related to the display unit, the image information indicating a color characteristic related to the image to be displayed on the display unit; a printing characteristic memory unit that receives printing characteristic data, the printing characteristic data being created by associating a reference image with the reference image that has undergone color conversion based on printing information and the image information, the printing information indicating a color characteristic related to the printing device; and an image correction unit that creates color correction information based on the display correction data and the printing characteristic data, and that performs color correction on an input image signal based on the created color correction information.

In order to achieve the above object, a color correction device according to the present invention includes a setting unit and an image conversion unit, the setting unit including: a data receiving unit that receives image information and printing characteristic data from another color correction device, the printing characteristic data being created by associating a reference image with the reference image that has undergone color conversion based on printing information and the image information, the printing information indicating a color characteristic related to a printing device, the image information indicating a color characteristic related to an image to be displayed on a display unit, the printing characteristic data being created by said another color correction device; and a display setting unit that outputs, to the image conversion unit, the printing characteristic data and the image information received by the data receiving unit, the image conversion unit including: a display correction data creation unit that creates display correction data based on display information and the image information, the display information indicating a color characteristic related to the display unit, the image information being received from the setting unit; a printing characteristic memory unit that receives the printing characteristic data from the setting unit; and an image correction unit that creates color correction information based on the display correction data and the printing characteristic data, the image correction unit performing color correction on an input image signal based on the created color correction information.

In order to achieve the above object, a display device according to the present invention includes: a display unit that displays an image; a display correction data creation unit that creates display correction data based on display information and image information, the display information indicating a color characteristic related to the display unit, the image information indicating a color characteristic related to the image to be displayed on the display unit; a printing characteristic memory unit that receives printing characteristic data, the printing characteristic data being created by associating a reference image with the reference image that has undergone color conversion based on printing information and the image information, the printing information indicating a color characteristic related to a printing device; and an image correction unit that creates color correction information based on the display correction data and the printing characteristic data, the image correction unit performing color correction on an input image signal based on the created color correction information, the display unit displaying an image based on the image signal that has undergone the color correction.

In order to achieve the above object, a correction coefficient calculation method according to the present invention includes: a reference image output step of generating a reference image; a profile receiving step of receiving image information and printing information, the image information indicating a color characteristic related to an image to be displayed on a display unit, the printing information indicating a color characteristic related to a printing device; and a reference image division step of creating printing characteristic data that associates the reference image with the reference image that has undergone color conversion based on the printing information and the image information.

In order to achieve the above object, a program according to the present invention causes a computer to execute: a reference image output step of generating a reference image; a profile receiving step of receiving image information and printing information, the image information indicating a color characteristic related to an image to be displayed on a display unit, the printing information indicating a color characteristic related to a printing device; and a reference image division step of creating printing characteristic data that associates the reference image with the reference image that has undergone color conversion based on the printing information and the image information.

Effect of the Invention

According to the present invention, a plurality of display devices can be easily adjusted to the output of a printing device that serves as a reference.

EMBODIMENTS FOR CARRYING OUT THE INVENTION

Hereunder, embodiments of the present invention are described in detail, with reference to the drawings.

Figure 1:
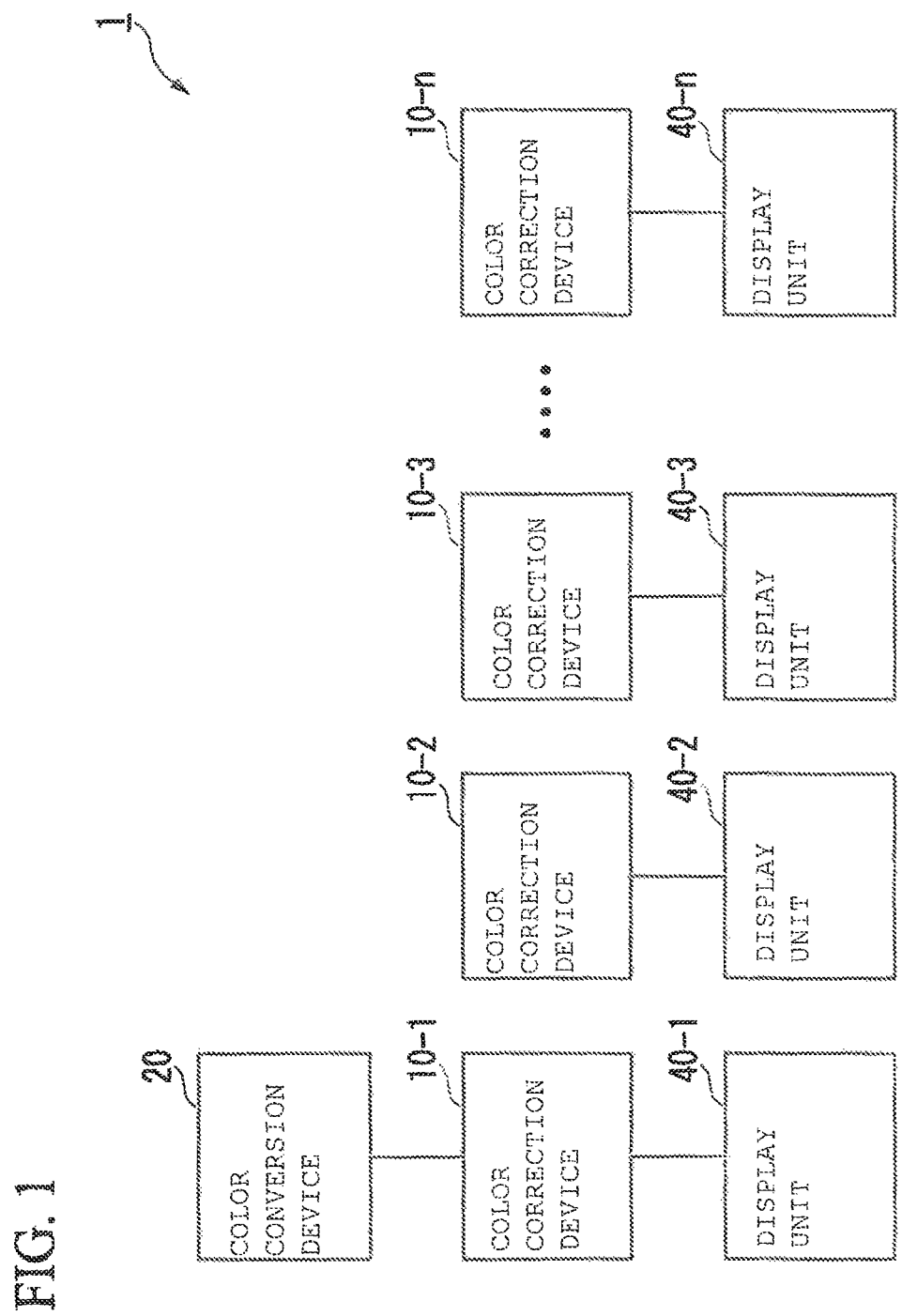
FIG. 1 is a schematic configuration diagram of a display system according to a present embodiment.

FIG. 1 is a schematic configuration diagram of a display system 1 according to a present embodiment.

As shown in FIG. 1, the display system 1 is configured by including color correction devices 10-1 to 10-$n$ (where n is an integer not less than 1), a color conversion device 20, and display units 40-1 to 40-$n$. In the following description, the color correction devices 10-1 to 10-$n$ are referred to as color correction device 10 unless otherwise specified, and the display units 40-1 to 40-$n$ are referred to as display unit 40 unless otherwise specified.

The display unit 40 is a liquid crystal panel, for example. The display element equipped in the display unit 40 may be a display element other than the liquid crystal type such as an organic electroluminescence display element, an inorganic electroluminescence display element, a PALC (plasma address liquid crystal), a PDP (plasma display panel), and an FED (field emission display). Moreover, the display unit 40 includes a backlight and a backlight driving unit (not shown in the figure).

To the color correction device 10-1 there are connected a color conversion device 20 and a display unit 40-1. The connection between the color correction device 10-1 and the color conversion device 20 may be a wired connection or wireless connection. Based on various types of information input, the color correction device 10-1 creates correction data (printing characteristic data and display correction data) for correcting an input video signal so as to achieve the same display characteristic as that of a printed material. The color correction device 10-1 uses the created printing characteristic data and display correction data to correct the input video signal and display it on the display unit 40-1. The color correction device 10-1 creates printing characteristic data, using image data in which the color space is converted by the color conversion device 20. The various types of information are rendering intent information, image profile information, and printing profile information.

To the color correction devices 10-2 to 10-n there are connected the display units 40-2 to 40-n respectively. Each of the color correction devices 10-2 to 10-n receives an image profile and printing characteristic data created by the color correction device 10-1, and based on the received printing characteristic data information and image profile, it creates correction data for correcting an input video signal (display correction data). Each of the color correction devices 10-2 to 10-n uses each created display correction data to correct the input video signal and display it on the display unit 40-1.

In FIG. 1, an example has been described in which the color correction device 10 and the display unit 40 are separated. However, the color correction device 10 and the display unit 40 may be integrated.

Here the various types of information used in the present embodiment are described.

Rendering intent information is a piece of information that defines the type of intention that color space conversion is to be performed for. For example, for a process in a case where a color reproduction region becomes narrow when performing conversion, an ICC profile has three color conversion tables namely perceptual, colorimetric, and saturation priority prepared therein.

Image profile information is a profile that corresponds to an image to be displayed on the display unit 40. There are various types of standard of image profile information such as sRGB, Adobe RGB, NTSC, and DCI.

Printing profile information (output profile information) is a profile that corresponds to a printing device (not shown in the figure). There are various types of standard of printing profile information such as Japan Color, SWOP, and Euro-Press.

Display profile information is a profile that corresponds to the color correction device 10. Display profile information is a piece of information that indicates a characteristic of the color correction device 10 to be used for previewing, and it differs for each display unit 40.

The profile information is data that defines a relationship between digital values and colors of the image, and the display unit 40, and the printing device. The profile information includes a mutual relationship between the RGB color space and the CMYK color space, a mutual relationship between the RGB (or sRGB) color space and the CIE XYZ color space, and a mutual relationship between the CMYK color space and the CIELAB color space, for example. In the present embodiment there is described a case of previewing a printed material in which an image of the sRGB standard is printed with the Japan Color standard.

Figure 2:
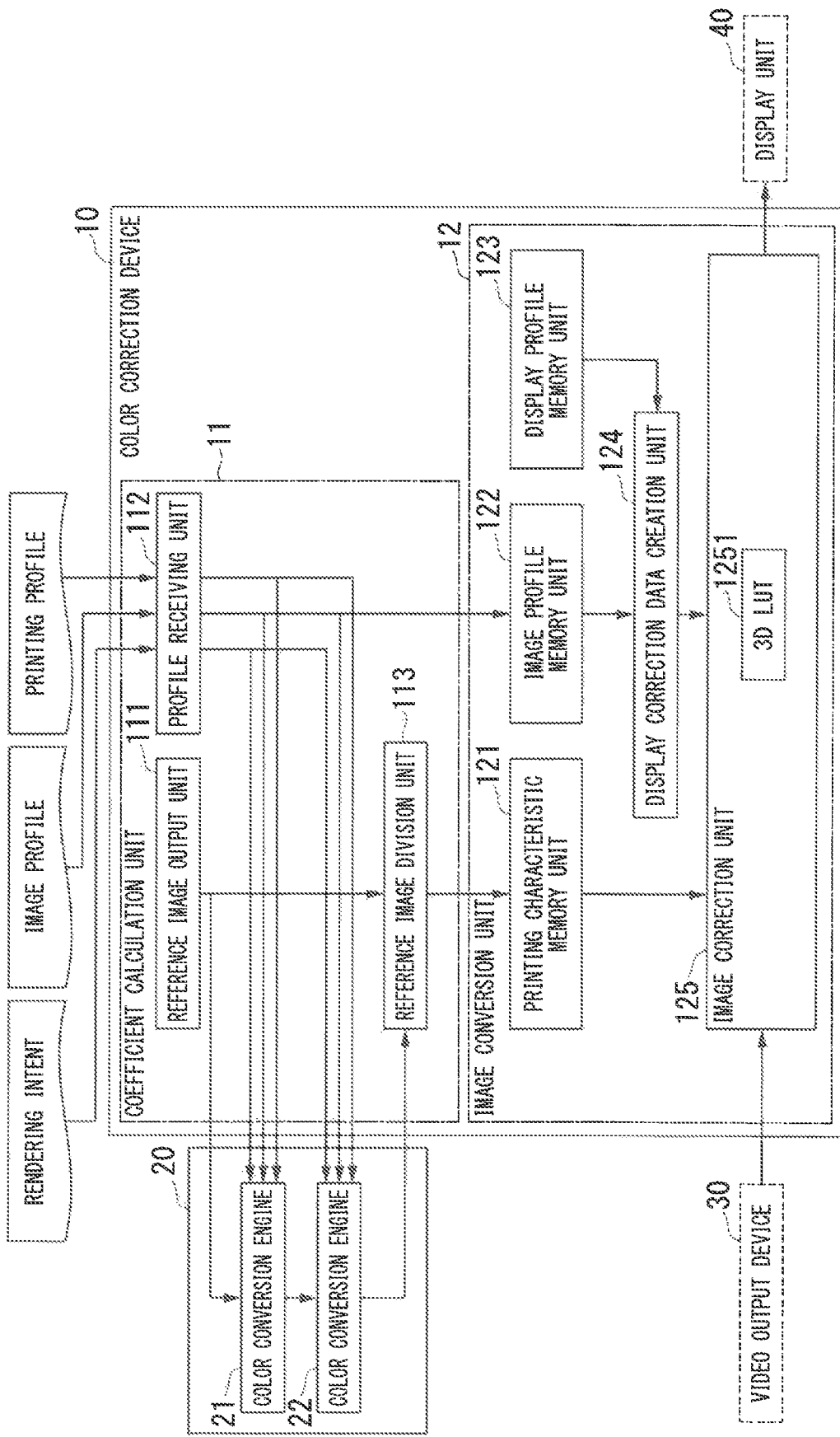
FIG. 2 is a block diagram of a schematic configuration of a color correction device and a color conversion device according to the present embodiment.

FIG. 2 is a block diagram of a schematic configuration of the color correction device 10 and the color conversion device 20 according to the present embodiment. As shown in FIG. 2, to the color correction device 10 there are connected a color conversion device 20, a video output device 30, and a display unit 40.

The video output device 30 outputs a video signal to the color correction device 10. The video output device 30 is a PC (personal computer) or a mobile terminal, for example.

The color correction device 10 includes a correction coefficient calculation unit 11 and an image conversion unit 12. Furthermore, the correction coefficient calculation unit 11 includes a reference image output unit 111, a profile receiving unit 112, and a reference image division unit 113.

The color correction device 10 transmits to the color conversion device 20, a reference image and parameters used in color conversion, receives the converted reference image from the color conversion device 20, and calculates color correction information from the reference image before and after the conversion. Moreover, the color correction device 10 performs color correction on the image signal inputted from the video output device 30 such as a personal computer or a video device, based on the calculated color correction information, and transmits the color-corrected image signal to the display unit 40. Here, the display unit 40 is an LCD (liquid crystal display), a PJ (projector) or the like, and it displays the image based on the image signal that has undergone the color correction.

Moreover, the parameters used in the color conversion include rendering intent information, image profile information corresponding to the reference image, and printing profile information corresponding to the printing device (output profile information).

Figure 3:
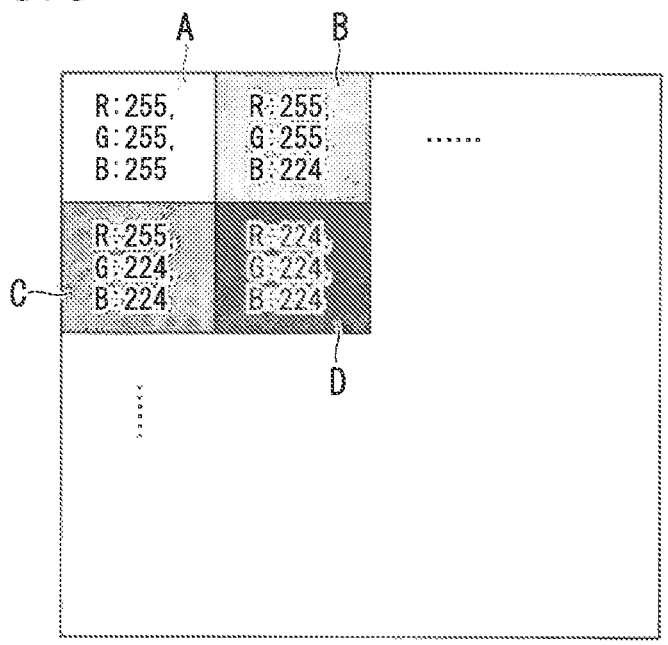
FIG. 3 is a diagram showing an example of a reference image in the present embodiment.

The reference image output unit 111 creates for example, the reference image shown in FIG. 3, and outputs the created reference image to the color conversion device 20 and the reference image division unit 113. The reference image includes for example, colors of the total correction points 9×9×9, which combine nine points in which the 256 scales (8 bit) of each of RGB (red, green, and blue) are extracted for every 32 scales. FIG. 3 is a diagram showing an example of a reference image in the present embodiment. As shown in FIG. 3, the reference image is an image in which color chips of 9×9×9 points correction points are arranged. The reference image is such that an image showing the color of (R, G, B)=(255, 255, 255) is arranged in the region A, and an image showing the color of (R, G, B)=(255, 255, 224) is arranged in the region B. Moreover, the reference image is such that an image showing the color of (R, G, B)=(255, 224, 224) is arranged in the region C, and an image showing the color of (R, G, B)=(224, 224, 224) is arranged in the region D. A color chip is a piece of information showing colors, and includes values that indicate the respective levels of three colors, red, green, and blue (R, G, B). Instead of using a reference image that includes color chips of several correction points, several reference images including only the color chip of a single correction point may be used.

The profile receiving unit 112 receives input of rendering intent information, image profile information that is selected by the user, and printing profile information. The profile receiving unit 112 outputs to the color conversion device 20, the rendering intent information, the image profile information, and the printing profile information that have been input. The profile receiving unit 112 outputs the input image profile information to the image conversion unit 12.

The reference image division unit 113 receives the reference image (FIG. 4) that has undergone the color conversion from the color conversion device 20, and receives an input of the reference image (FIG. 3) from the reference image output unit 111. Moreover, the reference image division unit 113 divides the region indicating the color included in each of the reference images before and after the color space conversion, into 9×9×9 image regions, and respectively associates the divided image regions for before and after the color conversion, to thereby calculate a correction coefficient (printing characteristic data). The reference image division unit 113 outputs the calculated printing characteristic data to the image conversion unit 12. The printing characteristic data is of a 3D LUT (3 dimension look up table) configuration, in which the reference image is set to an input point group and the image received from the color conversion device 20 is set to an output point group.

Figure 4:
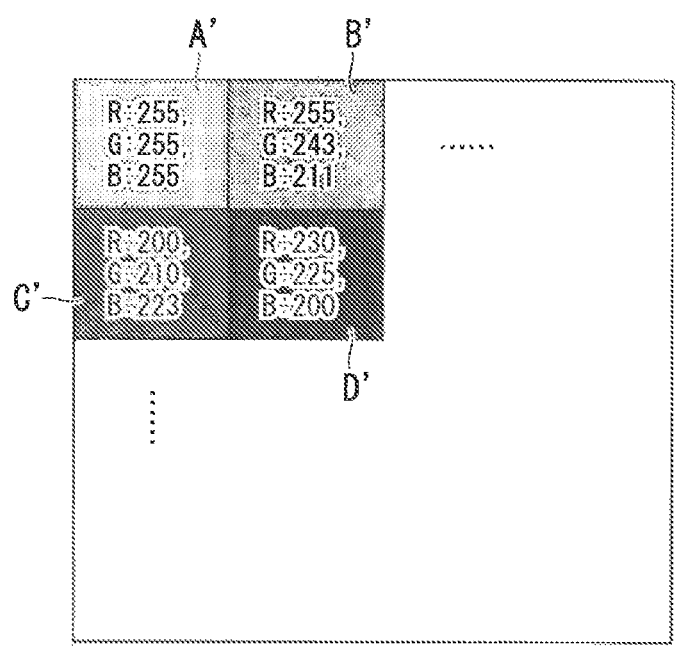
FIG. 4 is a diagram showing an example of a reference image in which the color space has been converted, in the present embodiment.

FIG. 4 is a diagram showing an example of the reference image that has undergone color space conversion, in the present embodiment. In the reference image that has undergone the color space conversion, as with the reference image (FIG. 3), there are arranged 9×9×9 image regions that have undergone the color conversion. As shown in FIG. 4, a region showing the color of (R, G, B)=(255, 255, 255) is arranged in the region A', an image showing the color of (R, G, B)=(255, 243, 211) is arranged in the region B', an image showing the color of (R, G, B)=(200, 210, 223) is arranged in the region C', and an image showing the color of (R, G, B)=(230, 225, 200) is arranged in the region D. Moreover, the color of the region A of FIG. 3 corresponds to that of the region A' of FIG. 4 that has undergone color conversion in the color conversion device 20. Similarly, the color of the region B corresponds to the color of the region B', the color of the region C corresponds to that of the region C', and the color of the region D corresponds to the color of the region D'.

The color conversion device 20 includes a color conversion engine 21 and a color conversion engine 22.

Based on the rendering intent information output by the profile receiving unit 112, the color conversion engine 21 converts, for example, the reference image of the sRGB color space output by the reference image division unit 113 into, for example, an image of the CMYK color space, using the image profile and printing profile. For example, the color conversion engine 21 converts an input reference image from the sRGB standard color space to the Japan Color standard color space. The color conversion engine 21 outputs the reference image, which has been color-converted into the image of the CMYK color space, to the color conversion engine 22.

The color conversion engine 22 converts the reference image of the CMYK color space output by the reference image division unit 113 into an image of the RGB color space, using the image profile and printing profile output by the profile receiving unit 112. The color conversion engine 22 outputs the reference image, which has been color-converted into the image of the RGB color space, to the reference image division unit 113 of the color correction device 10. For example, the color conversion engine 22 converts an input reference image from the Japan Color standard color space to the sRGB standard color space. The color conversion engines 21 and 22 are applications or software included in operating systems that are commonly and widely used, such as ACE of Adobe Systems Incorporated, ICM 2.0 or WCS of Microsoft Corporation, and Color Sync (registered trademark) of Apple Inc.

The image conversion unit 12 includes a print characteristic memory unit 121, an image profile memory unit 122, a display profile memory unit 123, a display correction data creation unit 124, and an image correction unit 125.

The print characteristic memory unit 121 stores printing characteristic data output by the reference image division unit 113.

The image profile memory unit 122 stores image profile information output from the profile receiving unit 112.

The display profile memory unit 123 stores a display profile including a display characteristic, color gamut, white spot, and gamma characteristic of the display unit 40 which is connected to the color correction device 10. The display profile memory unit 123 may store display characteristic information. In this case, the image conversion unit 12 may use the display characteristic stored in the display profile memory unit 123 to thereby create a display profile.

The display correction data creation unit 124 reads an image profile stored in the image profile memory unit 122, and reads a display profile stored in the display profile memory unit 123. The display correction data creation unit 124 creates display correction data by means of a commonly known method, based on the image profile that defines the relationship of conversion from the RGB color space to the CIE XYZ color space, and the display profile that defines the relationship of conversion from the CIE XYZ color space to the RGB color space. With this display correction data, conversion to the different RGB color space becomes possible. The display correction data creation unit 124 outputs the created display correction data to the image correction unit 125.

The image correction unit 125 includes a 3D LUT (3 dimension look up table) 1251. The image correction unit 125 reads the printing characteristic data stored in the print characteristic memory unit 121, and receives the display correction data output by the display correction data creation unit 124. The image correction unit 125 creates a correction coefficient using the printing characteristic data and the display correction data, and sets the created correction coefficient to the 3D LUT 1251. The image correction unit 125 corrects the input video signal based on the 3D LUT 1251, and outputs the corrected video signal to the display unit 40. The image correction unit 125 may include a gamma correction unit (1D LUT×3) and a backlight driving unit.

Figure 5:
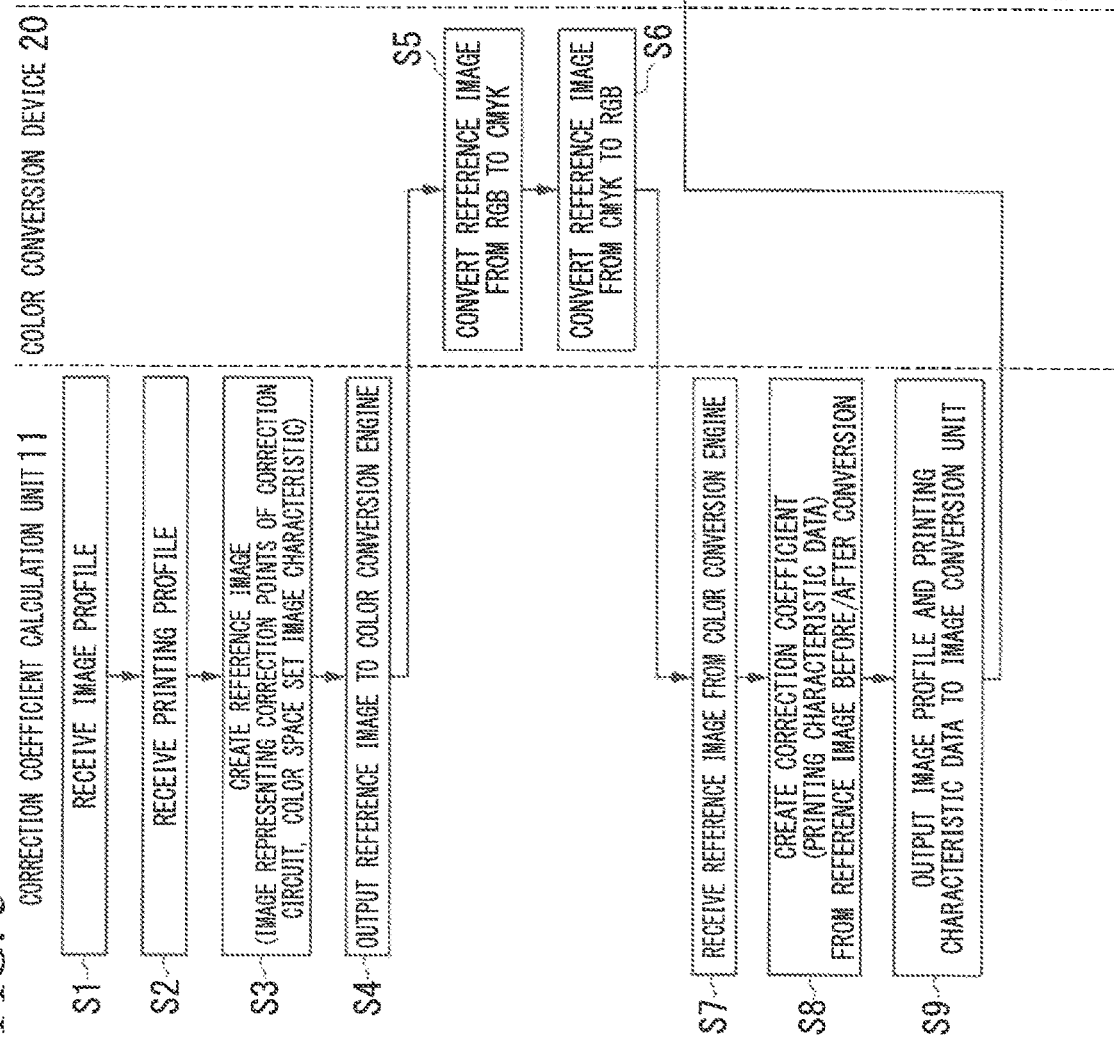
FIG. 5 is a flowchart of process steps performed by the color correction device and the color conversion device according to the present embodiment.

Next, processes performed by the correction coefficient calculation unit 11, the color correction device 10, and the color conversion device 20 are described. FIG. 5 is a flowchart of process steps performed by the color correction device 10 and the color conversion device 20 according to the present embodiment.

(Step S1) The profile receiving unit 112 receives an image profile (for example, sRGB standard data).

(Step S2) The profile receiving unit 112 receives a printing profile (for example, Japan Color standard data).

(Step S3) The reference image output unit 111 creates a reference image. The reference image to be created is an image that represents correction points of the color correction device 10.

(Step S4) The reference image output unit 111 outputs the created reference image to the color conversion engine 21 of the color conversion device 20.

(Step S5) Based on the rendering intent information output by the profile receiving unit 112, the color conversion engine 21 converts, for example, the reference image of the RGB color space output by the reference image division unit 113 into, for example, an image of the CMYK color space, using the image profile and printing profile.

(Step S6) The color conversion engine 22 converts the reference image of the CMYK color space output from the reference image division unit 113 into an image of the RGB color space, using the image profile and printing profile output from the profile receiving unit 112. The color conversion engine 22 outputs the reference image, which has been color-converted into the image of the RGB color space, to the reference image division unit 113 of the color correction device 10.

(Step S7) The reference image division unit 113 receives the reference image that has undergone the color conversion from the color conversion device 20.

(Step S8) The reference image division unit 113 divides the region indicating the color included in each of the reference images before and after the color space conversion, into 9×9×9 image regions, and respectively associates the divided image regions for before and after the color conversion, to thereby create printing characteristic data, which is a correction coefficient.

(Step S9) The reference image division unit 113 outputs the created printing characteristic data to the image conversion unit 12.

(Step S10) The image conversion unit 12 uses the display characteristic stored in the display profile memory unit 123 to thereby create a display profile.

(Step S11) The display correction data creation unit 124 creates display correction data based on the image profile read from the image profile memory unit 122 and the display profile read from the display profile memory unit 123.

(Step S12) The image correction unit 125 reads the printing characteristic data stored in the print characteristic memory unit 121, and receives the display correction data output by the display correction data creation unit 124. Next, the image correction unit 125 creates a correction coefficient, using the printing characteristic data and the display correction data, and sets the created correction coefficient to the 3D LUT 1251.

(Step S13) The image correction unit 125 corrects the input video signal based on the 3D LUT 1251, and outputs the corrected video signal to the display unit 40.

This completes the processes performed by the color correction device 10 and the color conversion device 20.

The processes of steps S1 through S13 complete image quality setting of the color correction device 10 to suit the printed material. Through these processes, the color correction device 10-1 stores the created printing characteristic data and display correction data.

The example above has been described as an example where the color correction device 10-1 includes a correction coefficient calculation unit 11 and an image conversion unit 12, and the color correction devices 10-2 to 10-n include a setting unit 13 and an image conversion unit 12. All of the color correction devices 10 may include a correction coefficient calculation unit 11, a setting unit 13, and an image conversion unit 12.

As described above, the correction coefficient calculation unit of the present embodiment includes: a reference image output unit that generates a reference image; a profile receiving unit that receives image information and printing information, the image information indicating a color characteristic related to an image to be displayed on a display unit, the printing information indicating a color characteristic related to a printing device; and a reference image division unit that creates printing characteristic data that associates the reference image with the reference image that has undergone color conversion based on the printing information and the image information.

Moreover, the image conversion unit of the present embodiment includes: a display correction data creation unit that creates display correction data based on display information and image information, the display information indicating a color characteristic related to a display unit, the image information indicating a color characteristic related to an image to be displayed on the display unit; a printing characteristic memory unit that receives printing characteristic data, the printing characteristic data being created by associating a reference image with the reference image that has undergone color conversion based on printing information and the image information, the printing information indicating a color characteristic related to a printing device; and an image correction unit that creates color correction information based on the display correction data and the printing characteristic data, the image correction unit performing color correction on an input image signal based on the created color correction information.

Furthermore, the color correction device of the present embodiment includes a correction coefficient calculation unit and an image conversion unit, the correction coefficient calculation unit including: a reference image output unit that generates a reference image; a profile receiving unit that receives image information and printing information, the image information indicating a color characteristic related to an image to be displayed on a display unit, the printing information indicating a color characteristic related to a printing device; and a reference image division unit that creates printing characteristic data that associates the reference image with the reference image that has undergone color conversion based on the printing information and the image information, the image conversion unit including: a display correction data creation unit that creates display correction data based on display information and image information, the display information indicating a color characteristic related to the display unit, the image information indicating a color characteristic related to the image to be displayed on the display unit; a printing characteristic memory unit that receives printing characteristic data, the printing characteristic data being created by associating a reference image with the reference image that has undergone color conversion based on printing information and the image information, the printing information indicating a color characteristic related to the printing device; and an image correction unit that creates color correction information based on the display correction data and the printing characteristic data, and that performs color correction on an input image signal based on the created color correction information.

With this configuration, the correction coefficient calculation unit of the present embodiment can create printing characteristic data. Moreover, with this configuration, the image conversion unit of the present embodiment can create display correction data.

Furthermore, since the color correction device of the present embodiment can create printing attribute data and display correction data, it is possible to perform color correction on an input image signal to suit the printing device.

Next is described image quality setting with respect to the color correction devices 10-2 to 10-n to suit a printed material.

Figure 6:
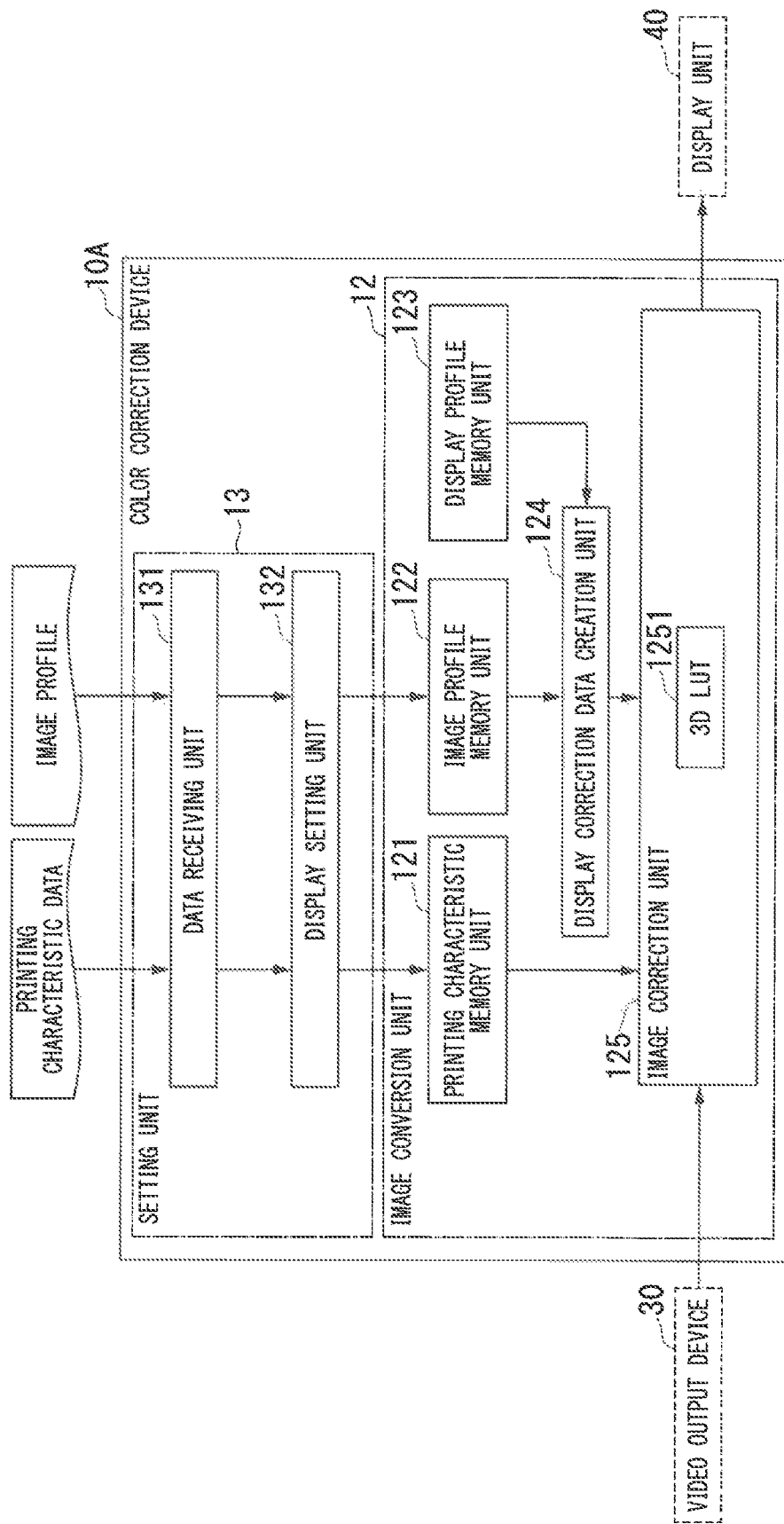
FIG. 6 is a block diagram of a schematic configuration of a color correction device according to the present embodiment.

FIG. 6 is a block diagram of a schematic configuration of a color correction device 10A according to the present embodiment. As shown in FIG. 6, to the color correction device 10A there are connected a video output device 30 and a display unit 40. Functional units having the same functions as those of the color correction device 10 are denoted by the same reference symbols, and descriptions thereof are omitted.

The color correction device 10A includes a setting unit 13 and an image conversion unit 12. Furthermore, the setting unit 13 includes a data receiving unit 131 and a display setting unit 132. Moreover, as with the color correction device 10, the image conversion unit 12 includes a print characteristic memory unit 121, an image profile memory unit 122, a display profile memory unit 123, a display correction data creation unit 124, and an image correction unit 125.

The data receiving unit 131 receives image profile information and printing characteristic data information from the color correction device 10-1, and outputs the received image profile information and the printing characteristic data information to the display setting unit 132. The data receiving unit 131 may transmit and receive image profile information and printing characteristic data information by means of wireless communication or wired communication, or may receive image profile information and printing characteristic data information via a recording medium such as a USB (universal serial bus).

The display setting unit 132 stores the printing characteristic data information output by the data receiving unit 131 in the print characteristic memory unit 121 of the image conversion unit 12. The display setting unit 132 stores the image profile information output by the data receiving unit 131 in the image profile memory unit 122.

Figure 7:
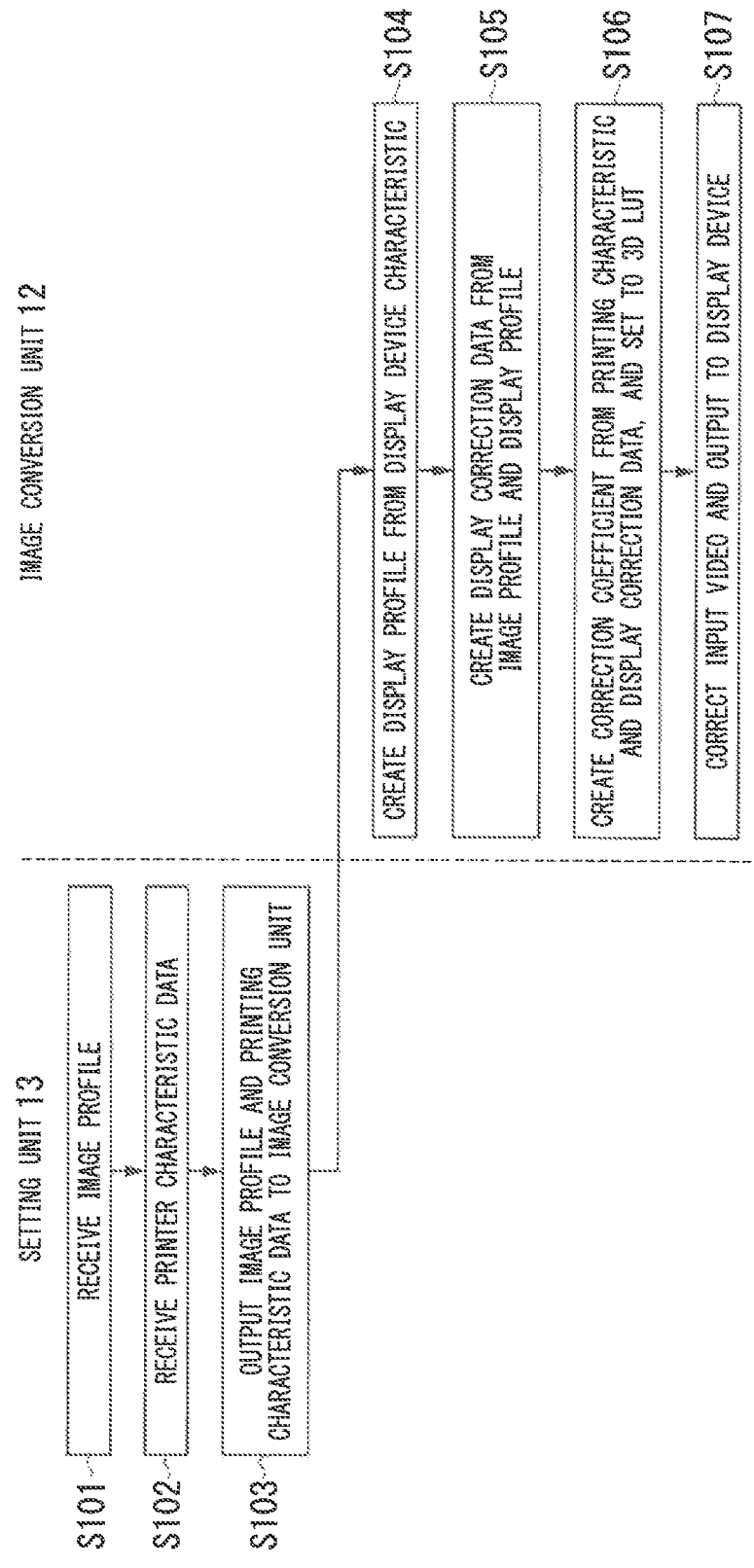
FIG. 7 is a flowchart of process steps performed by a setting unit and an image conversion unit according to the present embodiment.

Next, processes performed by the setting unit 13 and the image conversion unit 12 are described. FIG. 7 is a flowchart of process steps performed by the setting unit 13 and the image conversion unit 12 according to the present embodiment.

(Step S101) The data receiving unit 131 receives image profile information from the color correction device 10-1.
(Step S102) The data receiving unit 131 receives printing characteristic data information from the color correction device 10-1.
(Step S103) The display setting unit 132 stores the printing characteristic data information output by the data receiving unit 131 in the print characteristic memory unit 121 of the image conversion unit 12. Next, the display setting unit 132 stores the image profile information output by the data receiving unit 131 in the image profile memory unit 122.
(Step S104) The image conversion unit 12 creates a display profile based on the characteristic of the display unit, and stores the created display profile in the display profile memory unit 123. The display profile may be preliminarily stored in the display profile memory unit 123.
(Step S105) The display correction data creation unit 124 creates display correction data based on the printing characteristic data read from the print characteristic memory unit 121 and the display profile read from the display profile memory unit 123. The display correction data created by the display correction data creation unit 124 in this step S105, in the case where the color correction device 10-2 performs the process, for example, is data that suit the display unit 40-2 connected to the color correction device 10-2. Therefore, it may differ from the display correction data created by the color correction device 10-1 in step S11 in some cases.
(Step S106) The image correction unit 125 creates a correction coefficient, using the printing characteristic data and the display correction data, and sets the created correction coefficient to the 3D LUT 1251.
(Step S107) The image correction unit 125 corrects the input video signal based on the 3D LUT 1251, and outputs the corrected video signal to the display unit 40.

This completes the processes performed by the setting unit 131 and the image conversion unit 12.

The processes of step S101 through step S107 complete the image quality setting of the color correction device 10-n to suit the printed material. For example, the administrator of the color correction devices 10-1 to 10-n can perform image quality setting on n units of color correction devices 10 to suit the printed material, by means of the processes of step S1 through step S13 and step S101 through step S107 described above. As a result, according to the present embodiment, for example, in the case where n=100, 100 units of color correction devices 10 can be all adjusted to achieve the same image display state.

As described above, the color correction device of the present embodiment includes a setting unit and an image conversion unit, the setting unit including: a data receiving unit that receives image information and printing characteristic data from another color correction device, the printing characteristic data being created by associating a reference image with the reference image that has undergone color conversion based on printing information and the image information, the printing information indicating a color characteristic related to a printing device, the image information indicating a color characteristic related to an image to be displayed on a display unit, the printing characteristic data being created by said another color correction device; and a display setting unit that outputs, to the image conversion unit, the printing characteristic data and the image information received by the data receiving unit, the image conversion unit including: a display correction data creation unit that creates display correction data based on display information and the image information, the display information indicating a color characteristic related to the display unit, the image information being received from the setting unit; a printing characteristic memory unit that receives the printing characteristic data from the setting unit; and an image correction unit that creates color correction information based on the display correction data and the printing characteristic data, the image correction unit performing color correction on an input image signal based on the created color correction information.

With this configuration, according to the present embodiment, even if there are a plurality of color correction devices 10, there may be a single color conversion device 20 including color conversion engines 21 and 22. Other color correction devices receive printing characteristic data that is created by the color conversion device 20 including the color conversion engines 21 and 22. As a result, according to the present embodiment, only a single license is needed when realizing a color conversion engine by means of software, and therefore, the cost of the display system 1 can be reduced significantly.

The processes described above may be performed by each color correction device 10 in a synchronized manner.

Figure 8:
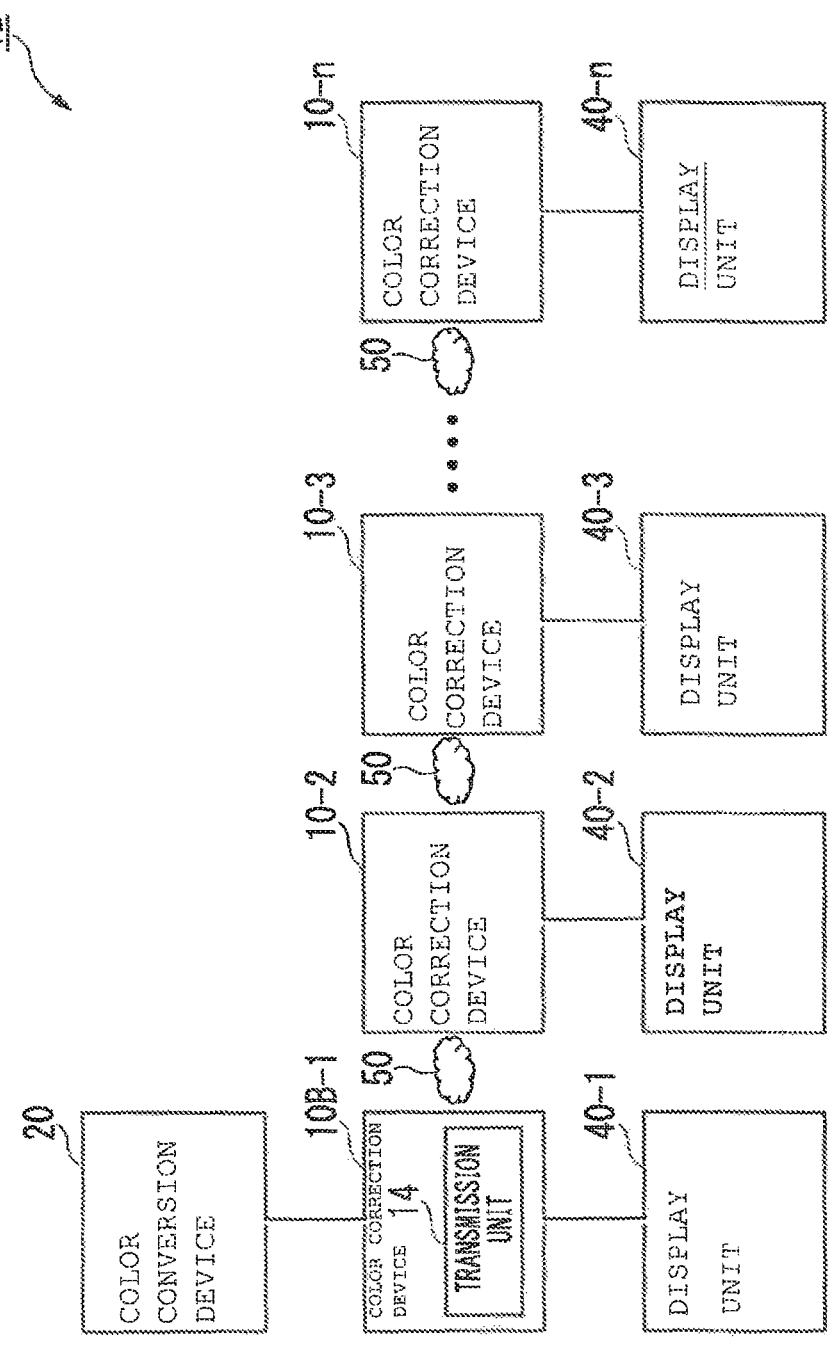
FIG. 8 is a schematic configuration diagram of a display system according to the present embodiment.

FIG. 8 is a schematic configuration diagram of a display system 1A according to the present embodiment. As shown in FIG. 8, the color correction device 10-1 includes a transmission unit 14. In FIG. 8, an example is shown where the color conversion device 20 is connected to the color correction device 10-1. However, any one of the color correction devices 10-1 through 10-n may be connected to the color conversion device 20. The color correction devices 10-1 to 10-n are connected to each other via a network 50. The network 50 is either a wired network or a wireless network.

The transmission unit 14 transmits the image profile information received by the data receiving unit 131 and the printing characteristic data created by the correction coefficient calculation unit 11, to the other color correction devices 10-2 to 10-n via the network 50.

Each of the color correction devices 10-2 to 10-n may acquire image profile information via the network 50.

For example, when the power supply of the preliminarily determined color correction device 10-1 among 100 units of the color correction devices 10 is brought to the ON state, the color correction device 10-1 acquires rendering intent information, image profile information, and printing profile information via the network 50. The color correction device 10-1 creates printing characteristic data, display correction data, and a correction coefficient. The color correction device 10-1 then transmits the created printing characteristic data and the acquired image profile information, to the color correction devices 10-2 to 10-n via the network 50. Then, each of the color correction devices 10-2 to 10-n creates display correction data and a correction coefficient based on, the received printing characteristic data and image profile information, and also the characteristics of the display units 40-2 to 40-n connected to the respective color correction devices 10.

Moreover, in the present embodiment, there has been described an example where the color correction device 10 acquires rendering intent information, image profile information, and printing profile information at the time of start-up for example. However, it is not limited to this. For example, in the case where several printing devices are connected to several color correction devices 10, the color correction device 10 needs to acquire rendering intent information, image profile information, and printing profile information for each printing device. In this case, for example, when using a different printing device, the administrator of the display system 1B may transmit, from the terminal that the administrator uses, rendering intent information, image profile information, and printing profile information to the color correction devices 10 via a network. Then, the preliminarily determined color correction device 10 may execute the processes of the steps S1 through S13 described above at the timing of having received these pieces of information.

As described above, according to the present embodiment, a setting operation that uses a number of files does not have to be repeatedly performed on all of the display devices (color correction devices 10 and display units 40). In this type of cumbersome operation, careless mistakes such as using an incorrect parameter is likely to occur. On the other hand, according to the present embodiment, there is no need for performing this type of cumbersome operation, and therefore, careless mistakes such as using an incorrect parameter can be avoided.

Furthermore, according to the present embodiment, the color conversion engine does not have to be installed on several PCs that are connected to the display devices (color correction devices 10 and display units 40), but only needs to be installed on a single PC. As a result, according to the present embodiment, since the license cost is required only for a single PC, the cost of the display system 1 (or 1B) can be reduced significantly.

Moreover, according to the present embodiment, after having transmitted single correction data to several display devices (color correction devices 10 and display units 40), the respective display devices (color correction devices 10 and display units 40) further correct the received correction data so as to suit the respective display units 40. Therefore the display characteristics of the several display devices can be matched.

Furthermore, in the present embodiment, there has been described an example where the color correction device 10 performs correction that is created with use of printing characteristic data. However, it is not limited to this. Since the printing characteristic data and the display correction data are separately stored in the color correction device 10, the user may use the color correction device 10, while using the display correction data, by switching whether or not to reflect the printing characteristic data according to the intended use. As a result, according to the present embodiment, changes in color associated with printing (difference between the original display characteristic and printing characteristic) can be confirmed by instantaneously switching the display characteristic of the display.

Moreover, in the present embodiment, there has been described an example where the color correction device 10 stores one each of image profile, printing characteristic data, and display correction data. However, it is not limited to this. The color correction device 10 may store several sets of image profile, printing characteristic data, and display correction data. The user may switch and use the stored settings according to the intended use.

In the present embodiment, there has been described an example where a single display unit 40 is connected to the color correction device 10 (or 10B) as shown in FIG. 1, FIG. 2, FIG. 6, and FIG. 8. However, there may be several display units 40. In the case where several display units 40 are connected to the color correction device 10, the image conversion unit 12 of the color correction device 10 may create display profile information for each display unit 40, and create display correction data for each display unit 40, using the created several display profiles. Then the color correction device 10 may use the created display correction data for each display unit 40, and correct the input image signal and display it on each display unit 40.

Furthermore, for example, in the case where two display units 40 are connected to the color correction device 10, as described above, a selection as to whether or not to reflect printing characteristic data for each display unit 40 may be allowed. For example, an image that reflects printing characteristic data may be displayed on one of the display units 40, and an image that does not reflect printing characteristic data may be displayed on the other display unit 40.

In the above embodiment, the reference image output unit 111 is of a configuration that outputs a reference image in which the 256 scales of each of RGB are extracted for every 32 scales. However, it is not limited to this, and correction points may be changed according to the image signal output by the video output device 30. For example, the user may select any one of color evaluation patterns such as ISO12646, GRACoL206, and FOGRA39, and a reference image may be generated based on the selected color evaluation pattern. As a result, as for conversion errors in the color conversion device 20, an image characteristic according to the picture and intended use of an image signal can be reflected on correction points, and errors in color conversion can be suppressed. An image characteristic, for example, in an image signal based on a movie film, is that dark pictures mainly with black colors are predominant.

Moreover, colors that are highly visible to the human eye such as skin colors may be prioritized, that is to say, many correction points may be arranged for colors that are close to skin colors, to generate a reference image. As a result, the level of reproduction in a print preview can be improved for printed materials, which often have photographs of people.

Moreover, the reference image output unit 111 may generate a reference image that includes colors of the total correction points 9×9×9, which combine nine points in which the 256 scales (8 bit) of each of RGB are extracted for every 32 scales, and a reference image in which only gray colors that change from black to white are taken as correction points. The user may then select from the reference images when performing print preview of a black-and-white printed material containing gray colors, and when performing print preview of colored printed material. As a result, it is possible to perform print preview according to the printed material, and the level of reproduction can be improved.

In the embodiment described above, the color conversion device 20 converts a reference image from an sRGB standard RGB value to a Japan Color standard CMYK value, and from a Japan Color standard CMYK value to an RGB value of the color space of the display device 4, through two color conversions. However, it is not limited to this. The color conversion device 20 may convert color information that is dependent on an input/output device of RGB or CMYK into PCS information of a color space that is independent of an input/output device, and may convert this PCS information into color information that is dependent on the input/output device. Here, the PCS standard shows a profile connection color space, and shows a color space that is independent of a display device such as Lab and XYZ, and an input/output device such as a printing device.

In the embodiment described above, the description has been made using a reference image that contains 9×9×9 color chips, which are correction points. However, it is not limited to this, and the number of correction points may be changed according to the memory capacity of the 3D LUT 1251.

Moreover, in the embodiment described above, there has been described a case where the color of the printed material output by the printing device is reproduced on the display unit 40. However, it is not limited to this, and the color of an output device other than a printing device that outputs an image may be reproduced on the display unit 40. The color of an image to be displayed by another display device other than the display unit 40 such as a projector, for example, may be reproduced on the display unit 40 (LCD display). In this case, instead of using printing profile information, profile information that corresponds to the output device may be used.

Furthermore, in the embodiment described above, the display profile memory unit 123 may use a standard value such as "2.2" as a preliminarily stored gamma characteristic. In this case, the display profile information stored in the display profile memory unit 123 includes a standard gamma characteristic represented by a standard value, or a gamma correction value for adjusting the display unit 40 to the standard gamma characteristic.

Moreover, the 3D LUT 1251 may calculate an additional correction value based on color vision abnormality or a different color vision characteristic such as a CIE1964X10Y10Z10 colorimetric system, and may perform color correction on the color of each pixel of the input image signal.

The example above has been described as an example where one color correction device 10 includes a correction coefficient calculation unit 11 and an image conversion unit 12, and another color correction device 10 includes a setting unit 13 and an image conversion unit 12. However, it is not limited to this. The PC may include a correction coefficient calculation unit 11 or a setting unit 13, and the display device may include an image conversion unit 12.

Figure 9:
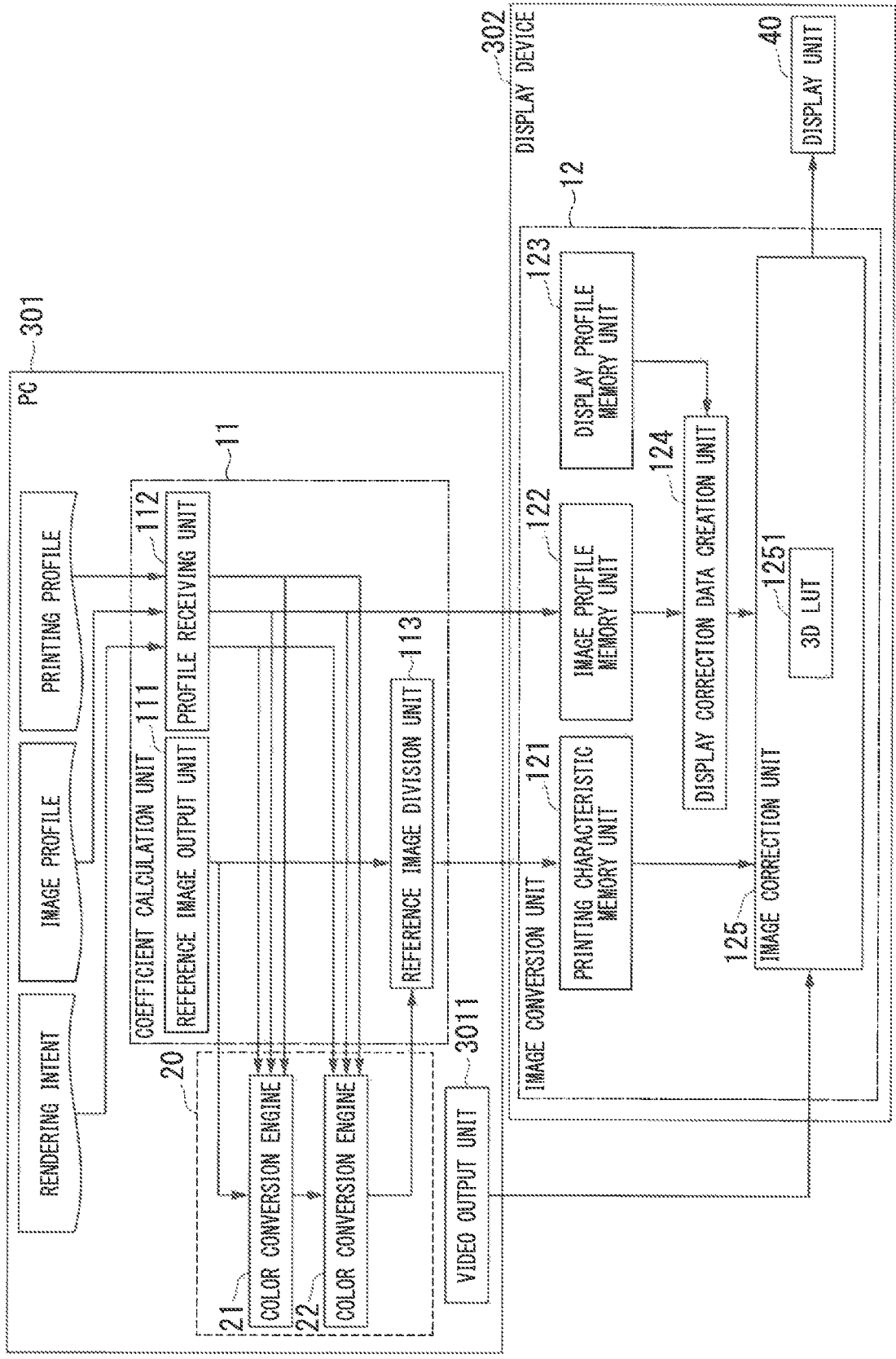
FIG. 9 is a block diagram of a schematic configuration of a PC including a correction coefficient calculation unit and a color conversion device, and a display device including an image conversion unit, according to the present embodiment.

FIG. 9 is a block diagram of a schematic configuration of a PC 301 including a correction coefficient calculation unit 11 and a color conversion device 20, and a display device 302 including an image conversion unit 12, according to the present embodiment.

Figure 10:
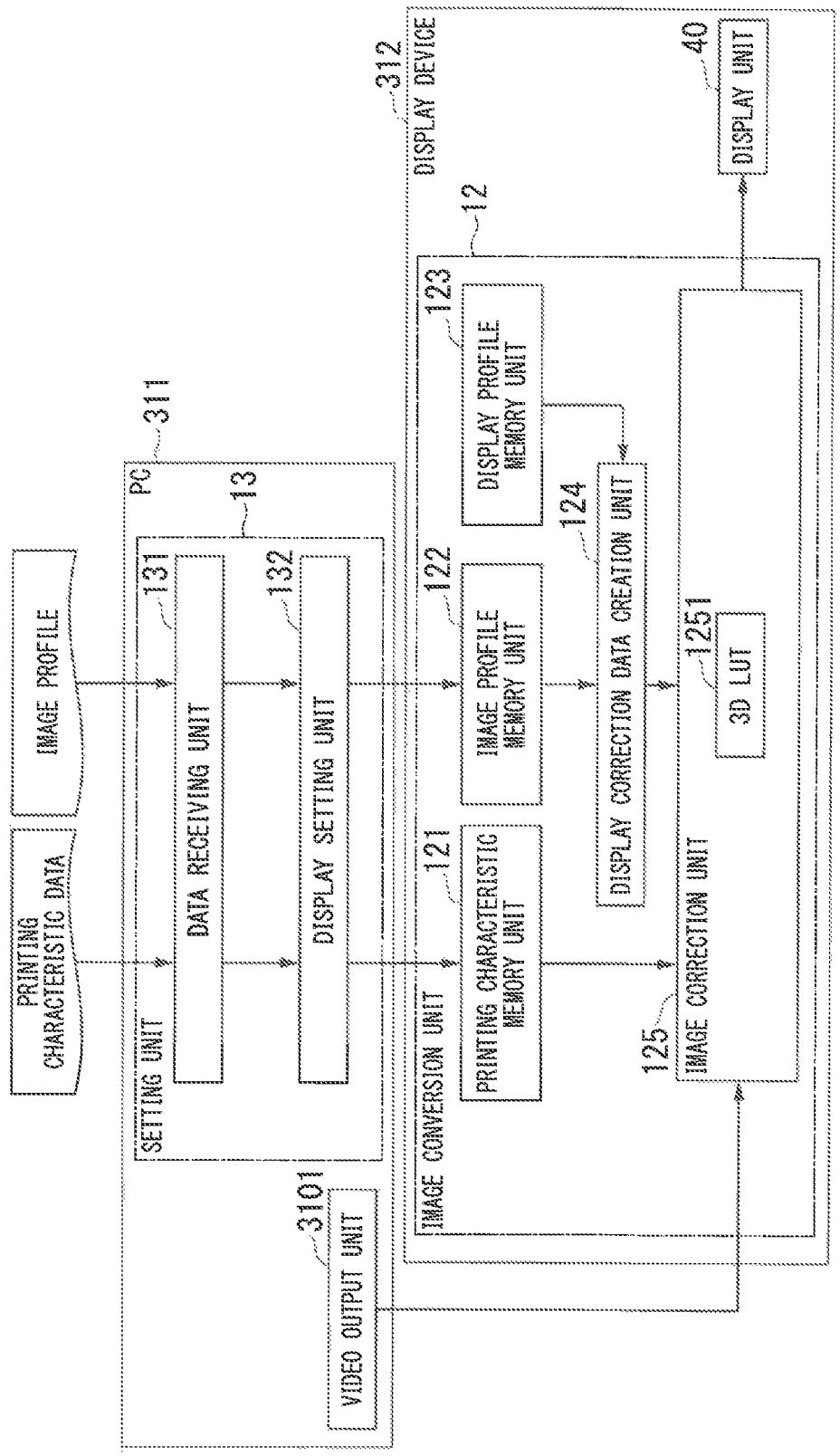
FIG. 10 is a block diagram of a schematic configuration of a PC including a setting unit, and a display device including an image conversion unit, according to the present embodiment.

As shown in FIG. 9, the display device 302 is connected to the PC 301. Moreover, the PC 301 includes a correction coefficient calculation unit 11, a color conversion device 20, and a video output unit 3011. Furthermore, the display device 302 includes an image conversion unit 12 and a display unit 40. Each configuration of the correction coefficient calculation unit 11, the color conversion device 20, and the image conversion unit 12 is similar to that of each unit of the color correction device 10 (FIG. 10).

The PC 301 and the display device 302 are connected via a cable that is capable of performing information exchange. The cable is a USB cable for example. Alternatively, information exchange may be performed via the video cable that connects the PC 301 and the display device 302.

The correction coefficient calculation unit 11 and the color conversion device 20 of the PC 301 create printing characteristic data, using the acquired rendering intent information, the image profile information, the printing characteristic information, and the created reference image. The PC 301 acquires the rendering intent information, the image profile information, and the printing profile information via a network or a recording medium that is connected to a USB terminal for example. The correction coefficient calculation unit 11 outputs the created printing characteristic data and the acquired image profile information to the display device 302. Moreover, the PC 301 outputs the video signal created by the PC 301, from the video output unit 3011 to the display device 302.

Furthermore, the PC 301 outputs the created printing characteristic data to another PC via a network.

The image conversion unit 12 of the display device 302 creates display correction data that suits the display unit 40 of the display device 312 itself, using the image profile information output from the PC 301 and the display profile information created by the display device itself. The image conversion unit 12 creates a correction coefficient using the received printing characteristic information and the created display correction data, and sets the created correction coefficient to the 3D LUT 1251. The image conversion unit 12 corrects the video signal input from the PC 301 based on the 3D LUT 1251, and outputs the corrected video signal to the display unit 40.

FIG. 10 is a block diagram of a schematic configuration of a PC 301 including a setting unit 13, and a display device 302 including an image conversion unit 12, according to the present embodiment.

As shown in FIG. 10, the display device 312 is connected to the PC 311. Moreover, the PC 311 to 311 includes a setting unit 13 and a video output unit 3101. As with the display device 302, the display device 312 includes an image conversion unit 12 and a display unit 40.

The setting unit 13 of the PC 311 receives image profile information, and printing characteristic data information output by the PC 301, via a network for example. The setting unit 13 outputs the received printing characteristic data information to the display device 312. Moreover, the setting unit 13 outputs the received image profile information to the display device 312. Furthermore, the PC 311 outputs the video signal created by the PC 311, from the video output unit 3101 to the display device 312.

As with the image conversion unit 12 of the display device 302, the image conversion unit 12 of the display device 312 creates display correction data that suits the display unit 40 of the display device 312 itself. The image conversion unit 12 creates a correction coefficient using the received printing characteristic information and the created display correction data, and sets the created correction coefficient to the 3D LUT 1251. The image conversion unit 12 corrects the video signal input from the PC 311 based on the 3D LUT 1251, and outputs the corrected video signal to the display unit 40.

In an environment where there are several combinations of a PC and a display device, the number of PCs 301 shown in FIG. 9 that includes a correction coefficient calculation unit 11 and a color conversion device 20 may be one. Another PC may be the PC 311 shown in FIG. 10 that includes a setting unit 13.

The PC 311 other than the PC 301 receives image profile information, and printing characteristic data information output by the PC 301, via a network, and outputs the received image profile information and printing characteristic data information to the connected display device 312. The image conversion unit 12 of each display device 312 connected to PC 311 corrects the video signal input from the PC 311 based on the 3D LUT 1251, and outputs the corrected video signal to the display unit 40.

In this manner, according to the present embodiment, by simply having only the PC 301 including a color conversion device 20, image quality setting that suits the printed material can be performed on the display device 302 and several display devices 312.

A program for realizing the functions of the color correction device 10 of FIG. 2, the color correction device 10A of FIG. 6, the correction coefficient calculation unit 11 and the color conversion device 20 of FIG. 9, and the image conversion unit 12 of FIG. 10 may be recorded on a computer-readable recording medium, and the program recorded on this recording medium may be read and executed on a computer system to thereby perform the process of each unit. The "computer system" here includes an OS and hardware such as peripheral devices.

Moreover, the "computer system" includes, in the case where a WWW system is used, a homepage provision environment (or display environment).

Furthermore, the "computer-readable recording medium" refers to a portable medium such as a flexible disk, magnetic optical disk, ROM (read only memory), and CD-ROM, a USB memory that is connected via a USB (universal serial bus) I/F (interface), or a memory device such as a built-in hard disk in a computer system. Furthermore, the "computer-readable recording medium" includes one that retains a program for a certain period of time, such as a volatile memory inside a computer system serving as a server or client. Moreover, the above program may be one that realizes a part of the functions described above, or may be one that realizes the functions described above in combination with a program that is already recorded on the computer system.

REFERENCE SYMBOLS 1, 1B Display system
10, 10A, 10B-1, 10-1 to 10-$n$ Color correction device
11 Correction coefficient calculation unit
12 Image conversion unit
14 Transmission unit
20 Color conversion device
21, 22 Color conversion engine
30 Video output device
40, 40-1 to 40-$n$ Display unit
50 Network
111 Reference image output unit
112 Profile receiving unit
113 Reference image division unit
121 Print characteristic memory unit
122 Image profile memory unit
123 Display profile memory unit
124 Display correction data creation unit
125 Image correction unit
1251 3D LUT
131 Data receiving unit
132 Display setting unit
301, 311 PC
302, 312 Display device
3011, 3101 Video output unit

The invention claimed is:

1. A display method comprising:
    displaying an image on a first display device;
    creating display correction data based on display information and first image information, the display information indicating a color characteristic related to the first display device, the first image information indicating a color characteristic related to the image to be displayed on the first display device;
    receiving characteristic data of a second display device, the characteristic data of the second display device being created by associating a reference image with the reference image that has undergone color conversion based on the first image information and second image information, the second image information indicating a color characteristic related to the second display device;
    creating color correction information based on the display correction data and the characteristic data of the second display device;
    performing color correction on an input image signal based on the created color correction information; and
    displaying, on the first display device, an image based on the image signal that has undergone the color correction, and
    wherein the reference image that has undergone color conversion is obtained by outputting the reference image, the first image information and the second image information from a correction coefficient calculation unit to a color conversion device, and performing, by the color conversion device, color conversion on the reference image, the color conversion device being separated from the correction coefficient calculation unit.

2. The display method according to claim 1, further comprising:
    receiving the second image information via a network.

3. The display method according to claim 1, comprising instructions stored and executed on a computer.

4. The display method according to claim 1, wherein the color correction is performed by a first device, and the color conversion is performed on a second device, the first device and the second device communicating via a network.

5. The display method according to claim 1, being executed on a first device comprising a processor,
    wherein the image signal that has undergone the color correction is transmitted via a network for displaying on the first display device, and
    wherein the first image information and the second image information are received by the first device via the network.

6. The display method according to claim 1, wherein the reference image is divided into a plurality of image regions indicating colors included in each of a plurality of the reference images before and after the color conversion, and respectively associates the divided image regions for before and after the color conversion, to calculate a correction coefficient.

7. The display method according to claim 1, wherein the displaying is on a plurality of the first display devices, the image based on the image signal that has undergone the color correction to thereby adjust the plurality of first display devices.

8. A correction coefficient calculation method comprising:
generating a reference image;
receiving first image information and second image information, the first image information indicating a color characteristic related to an image to be displayed on a first display device, the second image information indicating a color characteristic related to a second display device; and
creating characteristic data of the second display device that associates the reference image with the reference image that has undergone color conversion based on the first image information and the second image information, and
wherein the reference image that has undergone color conversion is obtained by outputting the reference image, the first image information and the second image information from a correction coefficient calculation unit to a color conversion device, and performing, by the color conversion device, color conversion on the reference image, the color conversion device being separated from the correction coefficient calculation unit.

9. The correction coefficient calculation method according to claim 8, further comprising:
receiving the second image information via a network.

10. The correction coefficient calculation method according to claim 8, comprising instructions stored and executed on a computer.

11. The correction coefficient calculation method according to claim 8, wherein the color correction is performed by a color correction device, and the color conversion is performed on a color conversion device, the color conversion device and the color connection device communicating via a network.

12. The correction coefficient calculation method according to claim 8, being executed on a first device comprising a processor,
wherein the image signal that has undergone the color correction is transmitted via a network for displaying on the first display device, and
wherein the first image information and the second image information are received by the first device via the network.

13. The correction coefficient calculation method according to claim 8, wherein the reference image is divided into a plurality of image regions indicating colors included in each of a plurality of the reference images before and after the color conversion, and respectively associates the divided image regions for before and after the color conversion, to calculate a correction coefficient.

14. The correction coefficient calculation method according to claim 8, wherein the displaying is on a plurality of the first display devices, the image based on the image signal that has undergone the color correction to thereby adjust the plurality of first display devices.

15. A display method comprising:
displaying an image on a first display device;
creating display correction data based on display information and first image information, the display information indicating a color characteristic related to the first display device, the first image information indicating a color characteristic related to the image to be displayed on the first display device;
receiving characteristic data of a second display device, the characteristic data of the second display device being created by associating a reference image with the reference image that has undergone color conversion based on the first image information and second image information, the second image information indicating a color characteristic related to the second display device;
creating color correction information based on the display correction data and the characteristic data of the second display device;
performing color correction on an input image signal based on the created color correction information; and
displaying, on the first display device, an image based on the image signal that has undergone the color correction,
wherein the color correction information is calculated from the reference image before and after the color conversion.

16. A correction coefficient calculation method comprising:
generating a reference image;
receiving first image information and second image information, the first image information indicating a color characteristic related to an image to be displayed on a first display device, the second image information indicating a color characteristic related to a second display device; and
creating characteristic data of the second display device that associates the reference image with the reference image that has undergone color conversion based on the first image information and the second image information, and
wherein the color correction information is calculated from the reference image before and after the color conversion.

* * * * *